(12) United States Patent  
Lohia

(10) Patent No.: US 7,734,744 B1
(45) Date of Patent: Jun. 8, 2010

(54) SYSTEM FOR COMMUNICATING MANAGEMENT INFORMATION AND METHOD OF OPERATION

(75) Inventor: Shriniwas Lohia, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 863 days.

(21) Appl. No.: 09/436,920

(22) Filed: Nov. 9, 1999

(51) Int. Cl.
*G06F 15/173* (2006.01)

(52) U.S. Cl. ............... 709/223; 709/226; 709/249; 709/250

(58) Field of Classification Search ......... 370/85.1, 370/216, 789; 709/223, 226, 100, 239, 249, 709/250; 395/280, 860, 200; 714/33
See application file for complete search history.

(56) References Cited

U.S. PATENT DOCUMENTS

| | | | | |
|---|---|---|---|---|
| 4,937,777 A * | 6/1990 | Flood et al. | ............... | 364/900 |
| 5,283,869 A * | 2/1994 | Adams et al. | ............... | 395/200 |
| 5,299,313 A * | 3/1994 | Peterson et al. | ............. | 395/200 |
| 5,408,614 A | 4/1995 | Thornton et al. | ............ | 395/275 |
| 5,416,776 A * | 5/1995 | Panzarella et al. | ........ | 370/85.1 |
| 5,438,614 A * | 8/1995 | Rozman et al. | ............. | 379/93 |
| 5,490,252 A * | 2/1996 | Macera et al. | ......... | 395/200.01 |
| 5,732,212 A * | 3/1998 | Perholtz et al. | ........ | 395/200.11 |
| 5,737,364 A | 4/1998 | Cohen et al. | .............. | 375/220 |
| 5,765,027 A * | 6/1998 | Wang et al. | ................ | 395/860 |
| 5,793,987 A | 8/1998 | Quackenbush et al. | ...... | 395/280 |
| 5,845,094 A * | 12/1998 | Beauchamp et al. | ........ | 395/280 |
| 6,070,253 A * | 5/2000 | Tavallaei et al. | ............ | 714/31 |
| 6,076,106 A * | 6/2000 | Hamner et al. | ............ | 709/223 |
| 6,192,414 B1 * | 2/2001 | Horn | ......................... | 709/239 |
| 6,208,616 B1 * | 3/2001 | Mahalingam et al. | ...... | 370/216 |
| 6,230,181 B1 * | 5/2001 | Mitchell et al. | ............ | 709/100 |
| 6,304,895 B1 * | 10/2001 | Schneider | ................. | 709/203 |
| 6,308,282 B1 * | 10/2001 | Huang et al. | ................. | 714/4 |
| 6,347,345 B1 * | 2/2002 | Cheon | ........................ | 710/20 |
| 6,373,841 B1 * | 4/2002 | Goh et al. | .................. | 370/389 |
| 6,381,218 B1 * | 4/2002 | McIntyre et al. | ........... | 370/245 |
| 6,388,658 B1 * | 5/2002 | Ahern et al. | ................ | 345/168 |
| 6,393,483 B1 * | 5/2002 | Latif et al. | .................. | 709/226 |

* cited by examiner

*Primary Examiner*—Rupal D Dharia
*Assistant Examiner*—Adnan Mirza
(74) *Attorney, Agent, or Firm*—Baker Botts L.L.P.

(57) ABSTRACT

A system for communicating management information includes a first interface card, a second interface card, and a management card coupled to the first interface card and the second interface card. The management card establishes a communication link between a client and a particular one of the first interface card and the second interface card selected in response to a command communicated by the client. The management card further communicates management information using the communication link.

15 Claims, 2 Drawing Sheets

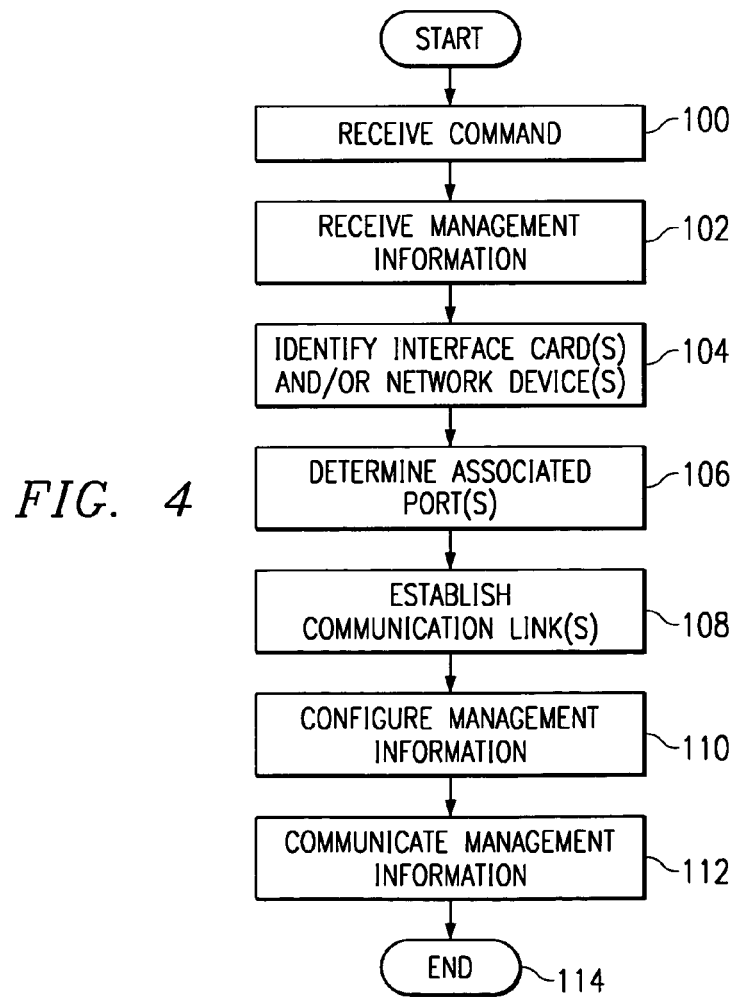

SYSTEM FOR COMMUNICATING MANAGEMENT INFORMATION AND METHOD OF OPERATION

TECHNICAL FIELD OF THE INVENTION

This invention relates in general to data communication, and more particularly to a system for communicating management information.

BACKGROUND OF THE INVENTION

Network devices are generally arranged in a chassis or housing at a particular location in a communication system. Each network device arranged in a particular chassis may be configured, initialized, or otherwise managed using consoles external to the chassis. A drawback to prior systems is that each network device in a chassis requires a corresponding, dedicated console to handle the management operations of the associated network device. A further drawback is that the interface card of each network device in the chassis must maintain a dedicated connection to its corresponding console. Such a configuration of consoles and network devices adds costs and complexities to the management operations of communication systems.

SUMMARY OF THE INVENTION

In accordance with the present invention, the disadvantages and problems associated with prior management systems have been substantially reduced or eliminated.

In accordance with one embodiment of the present invention, a management system includes a first interface card, a second interface card, and a management card coupled to the first interface card and the second interface card. The management card establishes a communication link between a client and a particular one of the first interface card and the second interface card selected in response to a command communicated by the client. The management card further communicates management information using the communication link.

Another embodiment of the present invention is a method for communicating management information that is performed by a management card. The method includes receiving a command from a client, the command identifying a particular one of the first interface card and a second interface card. The method continues by establishing a communication link between the client and the particular interface card in response to receiving the command. The method concludes by communicating management information to the particular interface card using the communication link.

Yet another embodiment of the present invention is a management card that includes a switch coupled to a first interface card and a second interface card. A processor coupled to the switch receives a command communicated by the client. The command identifies a particular one of the first interface card and the second interface card. The processor further commands the switch to establish the communication link between the client and the particular interface card.

Technical advantages of the present invention include a management card that establishes a communication link between a client and a particular one of a number of interface cards in response to a command communicated by the client, and communicates management information to the particular interface card using the established communication link. In this respect, one client may manage many interface cards and/or their associated network devices using the management card of the present invention. The configuration and operation of components in the present invention ameliorates a problem with prior management systems that require each network device to maintain a dedicated communication link to a dedicated client in a one-to-one configuration. The present invention therefore results in decreased costs and complexity in managing network devices.

Other technical advantages are readily apparent to one skilled in the art from the following figures, descriptions and claims.

BRIEF DESCRIPTION OF THE DRAWINGS

For a more complete understanding of the present invention and its advantages, reference is now made to the following description taken in conjunction with the accompanying drawings, in which like reference numbers indicate like features and wherein:

FIG. 3 illustrates one embodiment of a mapping table used by the system; and

FIG. 4 illustrates a flowchart of an exemplary method for communicating management information according to the present invention.

DETAILED DESCRIPTION OF THE INVENTION

Figure 1:
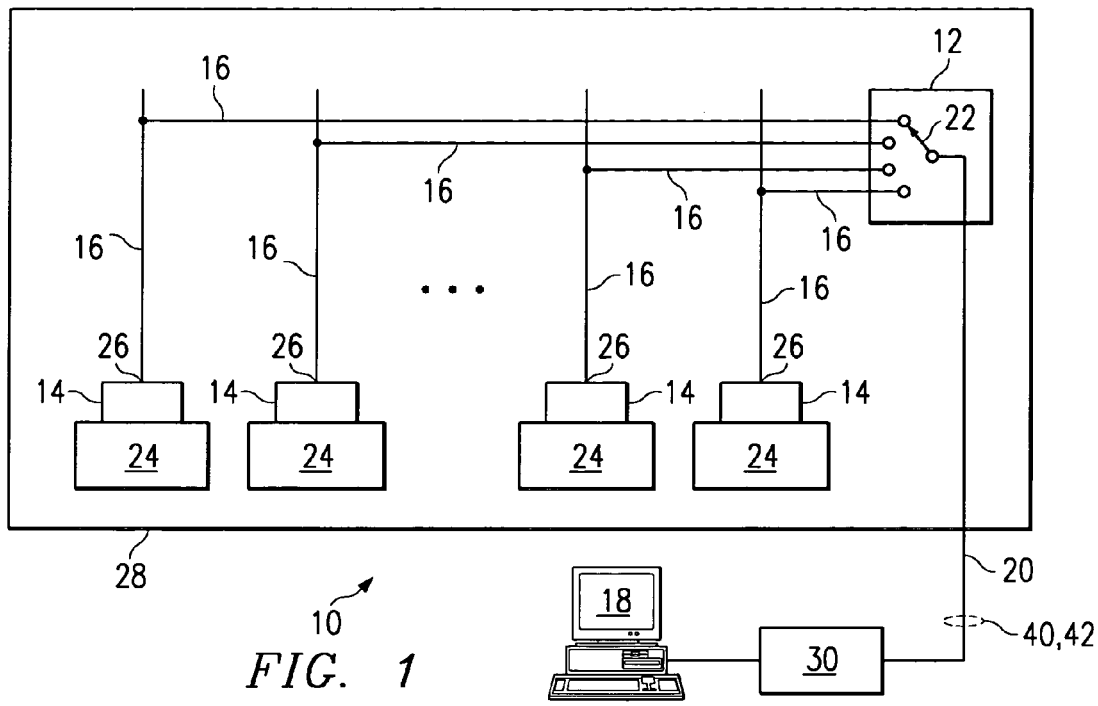
FIG. 1 illustrates a system for communicating management information according to the present invention.

FIG. 1 illustrates a management system 10 that includes a management card 12 coupled to a number of interface cards 14 using links 16 and coupled to a client 18 using a link 20. In general, client 18 handles the primary management responsibilities for each of interface cards 14 and/or associated network devices 24 using management card 12.

Management card 12 comprises any suitable combination of hardware and software components that establish one or more communication links 22 between client 18 and one or more interface cards 14 selected in response to a command 40, and communicate management information 42 to the interface cards 14 using communication links 22. Although management card 12 is illustrated separate from interface cards 14, it should be understood that management card 12 may be formed integral to or separate from a particular interface card 14. Management card 12 is described in greater detail with respect to FIG. 2.

Although the following description of system 10 is detailed with reference to establishing a communication link 22 between a client 18 and a particular one of interface cards 14, it should be understood that management card 12 may establish and maintain communication links 22 between a client 18 and any number and combination of interface cards 14. A communication link 22 comprises any switched communication path that couples client 18 to an interface card 14 and communicates management information 42 using any suitable communication protocols, standards, and/or formats.

Command 40 comprises information selecting one or more of interface cards 14 and/or network devices 24 to which management information 42 is directed. Although the following description of system 10 is detailed with respect to a command 40 comprising information selecting particular interface cards 14, it should be understood that command 40 may also comprise information selecting particular network devices 24.

Management information 42 comprises information communicated to interface cards 14, such as configuration information, status information, addressing information, initialization information, management information base (MIB) variables, commands, requests, firmware patches, software files, or any other suitable arrangement of information used to manage the operation of an interface card 14 and/or associated network device 24. Management information 42 may further comprise information communicated to client 18 by an interface card 14, such as, for example, in response to a request.

Each interface card 14 comprises any suitable combination of hardware and software components that enable network devices 24 to communicate with various components of a communication network (not explicitly shown) and with other components of system 10. For example, interface cards 14 include management ports 26 that couple network devices 24 to management card 12 using links 16 such that devices 24 may communicate with management card 12. Network devices 24 comprise computers, servers, workstations, IP telephones, routers, bridges, switches, gateways, hubs, and any other suitable electronic devices that may be managed by client 18 using management card 12.

Links 16 comprise any suitable communication paths between management card 12 and interface cards 14. In a particular embodiment, links 16 comprise serial communication paths that support the RS-232 communication standards. The RS-232 communication standards cover the mechanical and signal interface between components of system 10 employing serial binary data interchange. Management card 12, interface cards 14, and network devices 24 generally reside in a single housing, rack mount, or chassis 28 at a particular location in management system 10.

Client 18 comprises a computer, a workstation, a console, a terminal, or any other suitable processing device that supports the management operations of interface cards 14 and/or network devices 24. Client 18 may execute software associated with management card 12 to perform the management operations of system 10. In one embodiment, client 18 couples locally to management card 12 of chassis 28 using link 20. In another embodiment, client 18 couples remotely to management card 12 of chassis 28 using link 20 and a modem 30. Link 20 comprises any suitable communication path that couples management card 12 to client 18. In a particular embodiment, link 20 comprises a serial communication path that supports the RS-232 communication standards. Modem 30 comprises any suitable communication device that transmits and receives data in management system 10 using any suitable communication protocol, standard, and/or format associated with link 20.

In operation, a user operates client 18 to communicate a command 40 and management information 42 to management card 12. Management card 12 receives command 40 communicated by client 18 and establishes one or more communication links 22 between client 18 and particular interface cards 14 selected in response to command 40. Using communication links 22, management card 12 communicates to the particular interface cards 14, the management information 42 communicated by client 18.

A particular advantage of the present invention is that one client 18 may manage many network devices 24 using management card 12. In this respect, management system 10 provides centralized management services to many network devices 24 of a particular chassis 28 using a single point of entry, such as management card 12. The configuration and operation of components in system 10 ameliorates a problem with prior management systems that require each network device 24 to maintain a dedicated communication link to a dedicated client 18 in a one-to-one configuration. System 10 therefore results in decreased costs and complexity in managing network devices 24.

Figure 2:
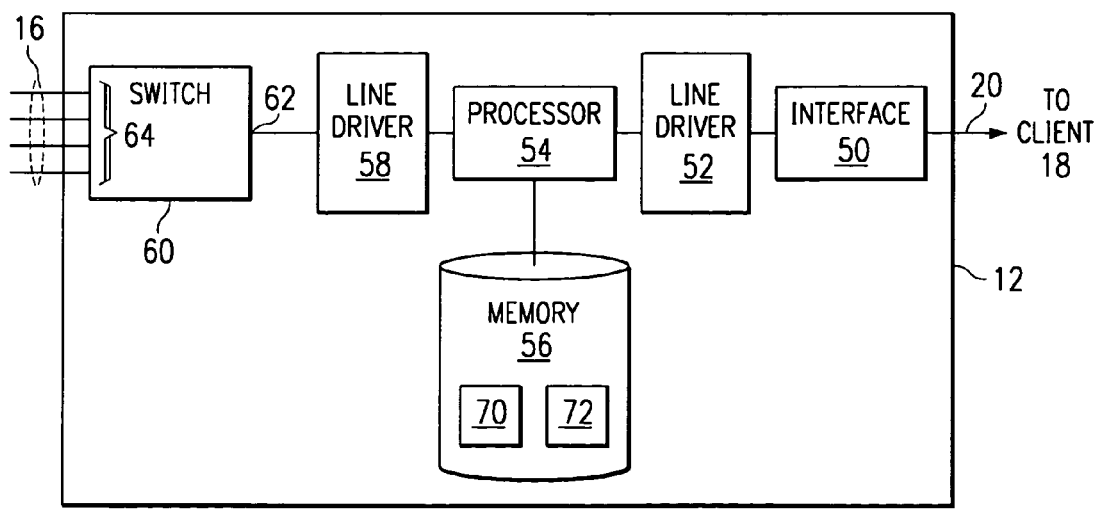
FIG. 2 illustrates one embodiment of a management card used by the system.

FIG. 2 illustrates management card 12 in more detail. Communication link 20 couples client 18 to interface 50. Interface 50 couples to a line driver 52, which in turn couples to a processor 54. Processor 54 manages the overall operation of management card 12 and couples to memory 56 and line driver 58. Line driver 58 couples to switch 60 at a first port 62. Links 16 couple to switch 50 at second ports 64.

Interface 50 comprises any suitable combination of hardware and software components that terminates communication link 20 in management card 12. In one embodiment, interface 50 comprises a serial port connection and link 20 comprises a serial communication path between client 18 and management card 12. In another embodiment, interface 50 supports a remote connection between client 18 and management card 12, established using modem 30.

Line driver 52 comprises any suitable combination of hardware and software components that convert information communicated using a communication format associated with link 20 and/or client 18 to a communication format associated with processor 54. For example, line driver 52 converts commands 40 and information 42 communicated by client 18 using link 20 in the RS-233 communication standards to any suitable format associated with processor 54, such as Transistor Transistor Logic (TTL).

Processor 54 comprises a central processing unit having any suitable general purpose data processing capabilities. Memory 56 comprises any suitable volatile or non-volatile memory device associated with processor 54. Memory 56 generally stores a number of files, lists, tables, or any other arrangement of information that support establishing communication links 22 and communicating management information 42 using communication links 22. For example, memory 56 stores program associated with links 16, interface cards 14, and/or network devices 24. Switch 60 establishes one or more communication links 22 between the appropriate ports 62 and 64 to couple client 18 to the appropriate interface cards 14. Management card 12 communicates management information 42 using communication link 22. In particular, management card 12 may communicate management information 42 from client 18 to interface cards 14 and/or may communicate management information 42 from interface cards 14 to client 18 such as, for example, in response to a request.

A particular operation performed by management card 12 to support the management of network devices 24 involves processor 54 populating the contents of mapping table 72. Upon receiving a command 40, an event time-out, or the occurrence of any other suitable trigger, processor 54 polls network devices 24 and/or interface cards 14 to determine the appropriate associations between device identifiers 80, operating system identifiers 82, and port identifiers 84 of mapping table 72. For example, processor 54 may poll the particular network device 24 and/or interface card 14 coupled to a particular port 64 of switch to determine the associated identifiers 80 and 82. Processor 54 populates mapping table 72 according to the results of its polling operation.

FIG. 4 illustrates a flowchart of an exemplary method for communicating management information 42 performed by management card 12 according to the present invention. The method begins at steps 100 and 102 where management card 12 receives a command 40 and management information 42 from client 18. Processor 54 of management card 12 identifies the interface cards 14 and/or network devices 24 to which management information 42 is directed using command 40 at step 104. At step 106, processor 54 determines the appropriate ports 64 of switch 60 associated with the particular interface cards 14 and/or network devices 24 identified at step 104, using the information stored in mapping table 72.

At step 108, switch 60 of management card 12 establishes one or more communication links 22 between port 62 and the ports 64 determined at step 106. In this respect, switch 60 couples client 18 to the appropriate interface cards 14 and/or network devices 24. Processor 54 and/or line driver 58 configure management information 42 at step 110 using the information stored in mapping table 72. For example, processor 54 configures management information 42 according to the operating systems associated with the network devices 24 identified at step 104. In another example, line driver 58 configures management information 42 according to the communication format of links 16. Management card 12 communicates management information 42 at step 112. In particular, management card 12 may communicate management information from client 18 to interface cards 14 and/or may communicate management information 42 from interface cards 14 to client 18 such as, for example, in response to a request. Execution terminates at step 114.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A system for communicating management information, comprising:
   a first interface card coupled to a first network device that uses a first operating system;
   a second interface card coupled to a second network device that uses a second operating system; and
   a management card coupled to the first interface card and the second interface card, the management card operable to:
      receive a command from a client, the command identifying an interface card or a network device associated with an interface card;
      establish a communication link between the client and a particular one of the first interface card and the second interface card selected in response to the command communicated by the client; and
      communicate management information using the communication link, wherein the management card comprises:
      a switch operable to establish the communication link between the client and one of a first port and a second port of the management card;
      a memory operable to store mapping information associating the first port with the first interface card and the second port with the second interface card; and
      a processor coupled to the memory and the switch, the processor operable to:
         receive the command;
         determine the port associated with the particular interface card using the mapping information;
         command the switch to establish the communication link between the client and the determined port; and
         configure the management information for the operating system of the network device associated with the particular interface card.

2. The system of claim 1, wherein the communication link comprises a serial communication path.

3. The system of claim 1, wherein the command comprises information selecting one of the first interface card and the second interface card.

4. The system of claim 1, wherein the management information comprises information used to configure a network device associated with the particular interface card.

5. A method for communicating management information performed by a management card, comprising:
   receiving a command from a client, the command identifying a particular one of a first interface card and a second interface card, wherein the first interface card is coupled to a first network device that uses a first operating system and the second interface card is coupled to a second network device that uses a second operating system;
   storing mapping information that associates a first port of a switch with the first interface card and a second port of the switch with the second interface card;
   establishing a communication link between the client and the particular interface card in response to receiving the command, wherein establishing the communication link comprises determining a port associated with a particular interface card using the mapping information and establishing a communication link between the client and the determined port using the switch;
   configuring management information for the operating system of the network device associated with the particular interface card; and
   communicating the management information using the communication link.

6. The method of claim 5, further comprising operating the client to generate the command and the management information.

7. The method of claim 5, wherein the communication link comprises a serial communication path.

8. The method of claim 5, wherein the command comprises information selecting one of the first interface card and the second interface card.

9. The method of claim 5, wherein the management information comprises information used to configure a network device associated with the particular interface card.

10. A management card, comprising:
    a switch coupled to a first interface card and a second interface card, the switch comprising a first port coupled to the first interface card and a second port coupled to the second interface card, wherein:
       the first interface card is coupled to a first network device that uses a first operating system;
       the second interface card is coupled to a second network device that uses a second operating system; and
       the switch is operable to establish a communication link between a client and one of the first port and the second port;
    a memory coupled to a processor and operable to store mapping information that associates the first port with the first interface card and the second port with the second interface card; and
    a processor coupled to the switch and operable to:
       receive a command communicated by the client, the command identifying a particular one of the first interface card and the second interface card;
       determine the port associated with the particular interface card using the mapping information;
       command the switch to establish a communication link between the client and the determined port; and configure management information for the operating system of the network device associated with the particular interface card.

11. The management card of claim 10, wherein the processor is further operable to communicate management information using the communication link.

12. The management card of claim 10, wherein the communication link comprises a serial communication path.

13. The management card of claim 10, wherein the command comprises information selecting one of the first interface card and the second interface card.

14. The management card of claim 10, wherein the management information comprises information used to configure a network device associated with the particular interface card.

15. A system for communicating management information, comprising:

means for receiving a command from a client, the command identifying a particular one of a first interface card and a second interface card, wherein the first interface card is coupled to a first network device that uses a first operating system and the second interface card is coupled to a second network device that uses a second operating system;

means for storing mapping information that associates a first port of a switch with the first interface card and a second port of the switch with the second interface card;

means for establishing a communication link between the client and particular interface card in response to receiving the command by determining a port associated with a particular interface card using the mapping information and establishing a communication link between the client and the determined port;

means for configuring management information for the operating system of the network device associated with the particular interface card; and means for communicating the management information using the communication link.

* * * * *